INVENTOR.
AUDIE B. TOMLINSON,
BY
Berman, Davidson & Berman
ATTORNEYS.

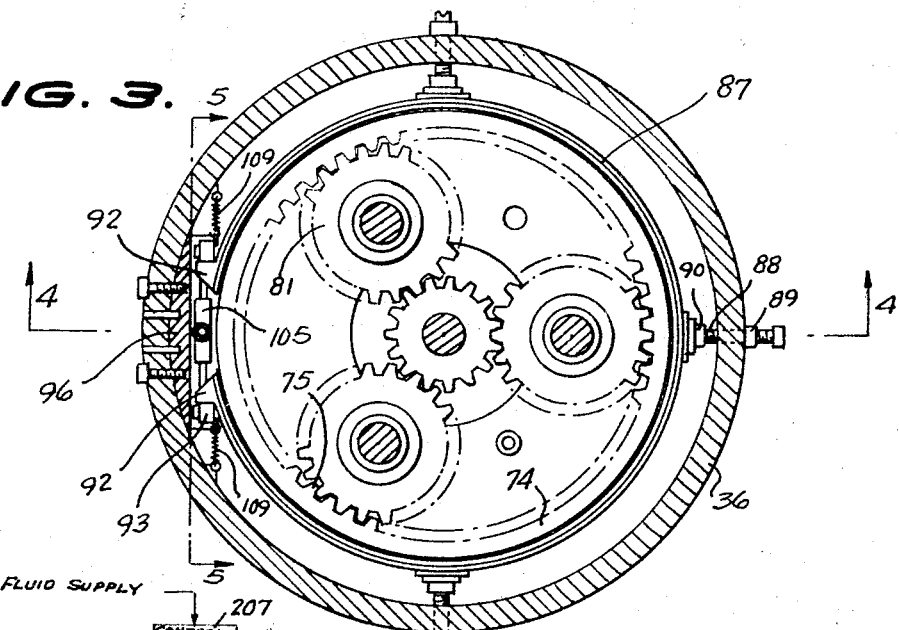
FIG. 3.
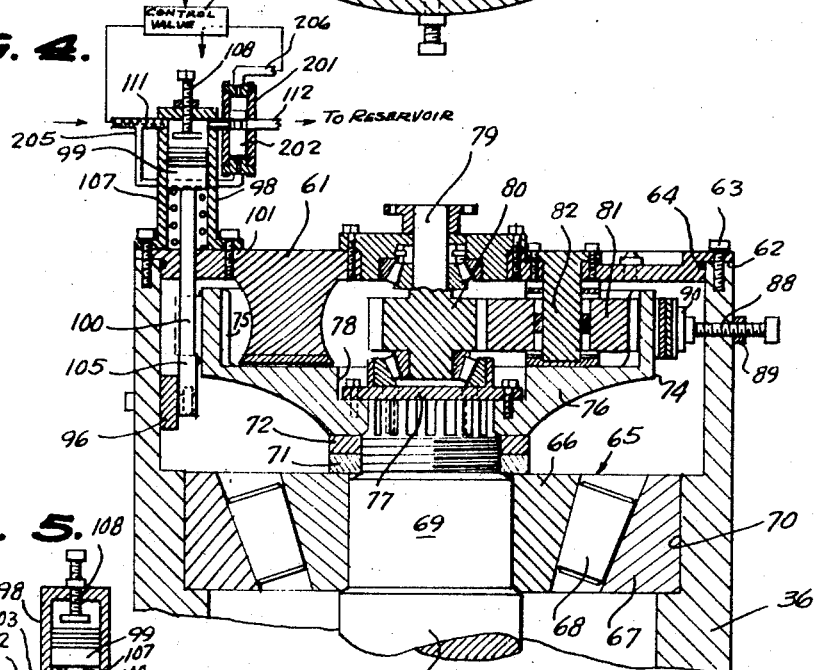
FIG. 4.
FIG. 5.
INVENTOR.
AUDIE B. TOMLINSON,
BY
*Burman, Davidson & Burman*
ATTORNEYS.

INVENTOR.
AUDIE B. TOMLINSON,
BY
Berman, Davidson & Berman
ATTORNEYS.

United States Patent Office 3,445,016
Patented May 20, 1969

3,445,016
SWIVELLING TOOL SUPPORT FOR
EARTH-WORKING MACHINE
Audie B. Tomlinson, Rte. 1, Box 188E,
La Grande, Oreg. 97850
Filed July 5, 1967, Ser. No. 651,172
Int. Cl. E02f 3/74, 3/84, 3/86
U.S. Cl. 214—138    5 Claims

ABSTRACT OF THE DISCLOSURE

A swivelling tool support for an earth-moving machine where the tool support has a shaft which can rotate continuously without interference from conduits supplying working field to implements carried by the shaft. The support has one or more hydraulic motors geraringly-coupled to the shaft and has a hydraulic brake mechanism acting on the shaft to lock it in an adjusted position. The shaft has passages and rotating seals allowing hydraulic working fluid to be transmitted to the implement mounted on the shaft, such as a scoop, or the like. The brake mechanism may be of the brake-band or brake-disc type.

---

This invention relates to swivelling tool supports for earth-working machines, and more particularly to a swiveling support for a hoe, bucket, shovel, or other tool capable of rotating continuously and of being locked to hold the tool at any desired angle around the axis of the support.

A main object of the invention is to provide a novel and improved swivelling tool support for an earth-working machine, for example, a machine of the type having a main boom on which the tool support is pivoted, with hydraulic cylinder means to adjust the pivoted position of the tool support, and with further hydraulic cylinder means to adjust the position of a scoop or other implement carried on the support, the improved tool support mechanism being arranged so that the implement carrying element thereof can be rotated continuously to any desired angle around the axis of the tool support without interference with conduits employed for conveying hydraulic fluid to the implements, the mechanism involving relatively simple components, being reliable in operation, and being provided with hydraulically-operated brake means for locking the implement-carrying shaft thereof in any desired rotated position.

A further object of the invention is to provide an improved swivelling tool support for earth-working machines which is capable of swivelling the tool carried thereby completely through and beyond an angle of 360° in either direction and which can be rotated freely without interference with conduits supplying working fluid to tool elements or other elements thereof, the improved swivelling support involving relatively inexpensive components, being durable in construction, being safe to use, and being protected from damage or contamination by external foreign materials such as dirt, grit, mud, or the like.

A still further object of the invention is to provide an improved swivelling tool support which is provided with an implement-carrying shaft rotatable universally to any desired position of orientation so that the associated machine can be employed over a wide range of conditions and for many different purposes with a high degree of efficiency and with the ability to rapidly adjust itself to the different conditions which may be encountered, the tool support being relatively compact in size, being easy to manipulate, and providing a considerable saving in time required to adjust the tool carried thereby to the correct position for use, as compared with the corresponding devices employed in the prior art.

Further objects and advantages of the invention will become apparent from the following description and claims, and from the accompanying drawings, wherein:

FIGURE 3 is an enlarged horizontal cross-sectional view taken substantially on the line 3—3 of FIGURE 2.

FIGURE 4 is a fragmentary vertical cross-sectional view taken substantially on the line 4—4 of FIGURE 3.

FIGURE 5 is a somewhat enlarged fragmentary transverse vertical cross-sectional view taken substantially on the line 5—5 of FIGURE 3.

Figure 7:
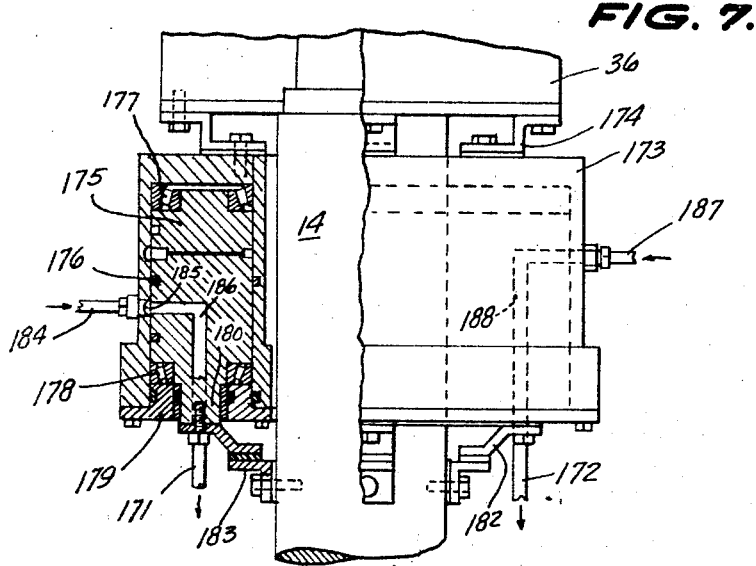
FIGURE 7 is an enlarged fragmentary vertical cross-sectional view taken substantially on the line 7—7 of FIGURE 2.
Figure 8:
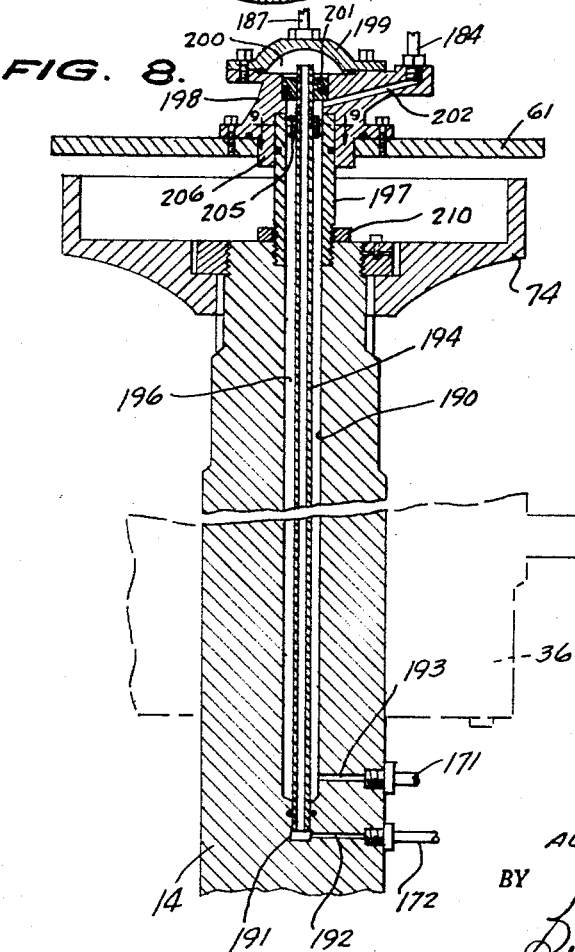

FIGURE 8 is a vertical cross-sectional view taken through the upper portion of the tool-supporting shaft of a tool-supporting assembly according to the present invention, showing passages for conveying hydraulic fluid to an implement carried by the shaft element of the tool support, in accordance with the present invention and being somewhat different from the corresponding structure shown in FIGURE 7.

Figure 9:
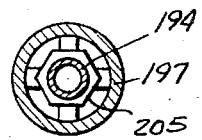

FIGURE 9 is an enlarged horizontal cross-sectional detail view taken substantially on the line 9—9 of FIGURE 8.

Figure 10:
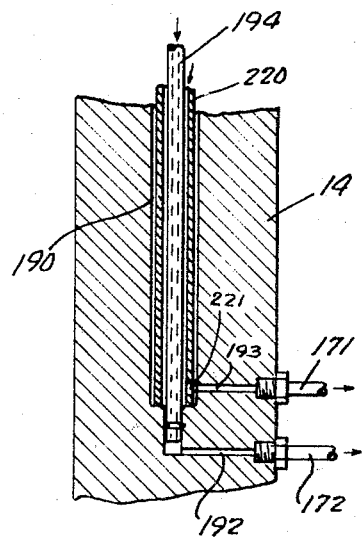

FIGURE 10 is a fragmentary vertical cross-sectional view, generally similar to FIGURE 8, but showing a further modification of the structure for conveying hydraulic fluid to the operating cylinder associated with an implement carried by the tool shaft.

Referring to the drawings, and more particularly to FIGURES 1 to 5, 11 designates a conventional digging tool, such as a bucket, hoe or shovel, which is shown attached by pivot 12 to the lower end of a tool support shaft 14. A rear portion of the tool is pivoted at 16 to the lower end of a piston rod 18 of a pressure fluid power device 20, such as a double-action hydraulic cylinder having pressure-fluid connections 22, 24 and whose upper end is pivoted at 26 to a bracket 28 welded or otherwise suitably secured to the support shaft 14. A pair of bent links 30 are pivoted at their ends about pins 32, 34 to the shaft 14 and the rod 18 of the hydraulic cylinder, respectively. Thus, application of pressure fluid to the cylinder through nipples, or connections, 24 or 22, will tilt the tool 11 with respect to the support shaft 14 in one direction or the opposite direction, so as to assist movements of other parts either in digging or in emptying earth and in performing the desired earth-moving operations.

The upper end of support shaft 14 is rotatably-supported in a generally cylindrical housing 36 by means to be presently described, the housing being pivoted to swing in the plane of the main boom, shown at 38, when the associated pressure-fluid-operating device 40 is activated. The device 40 comprises a hydraulic cylinder having a ram 42 and hydraulic fluid conduits 44 and 46 connected to the opposite ends of the cylinder. In the embodiment illustrated, the housing 36 is of cylindrical shape, although other shapes may be employed, and the housing 36 is provided with diametrically-opposed projecting stub axles 48 which are pivotally-secured in openings in the forks 50 at the end of the boom 38. A pair of spaced brackets 52, 52 attached to the boom 38 serve to hold the pivot shaft 54, which also passes through an opening in a projection 56 on the inner end of cylinder 40. The outer end of the ram 42 of the fluid-pressure cylinder is pivoted at 58 to a pair of spaced brackets 60, 60 having arcuate legs welded to the upper end of housing 36. Thus, application of pressure fluid through conduits 44 and 46 in one direction or the other will extend, or retract, the ram 42, whereby to swing housing 36 in the plane of the boom, so as to fold the tool at the bottom of shaft 14 toward the boom or away from the boom, respectively.

Figure 1:
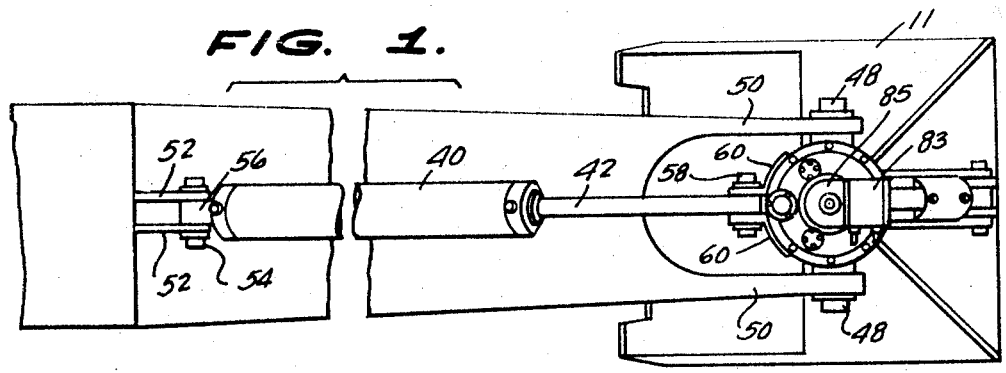
FIGURE 1 is a top plan view of a portion of the boom of an earth-working machine provided with an improved swivelling tool support constructed in accordance with the present invention.
Figure 2:
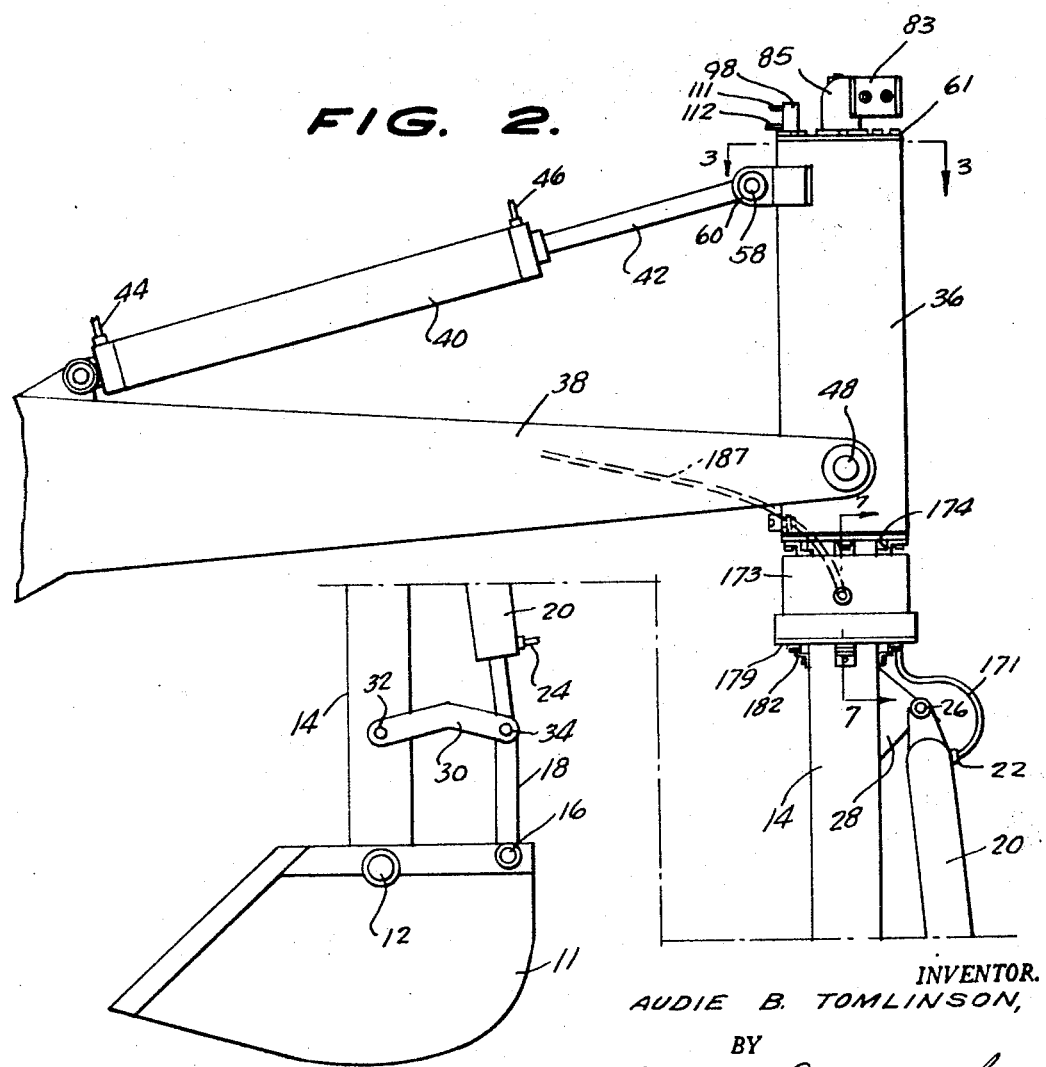
FIGURE 2 is a side elevational view of the structure including the tool support, as illustrated in FIGURE 1.

FIGURE 2 shows the tool support with the pressure device 40 actuated to approximately mid-position of ram 42 wherein the tool support shaft 14 is substantially vertical.

The means for rotatably-supporting and driving the tool support shaft 14 in one form of the invention are illustrated in FIGURES 3, 4 and 5. It will be seen that the housing 36 is provided with the top wall 61 which is formed with a peripheral annular recess 62 receiving the top rim of the main body of housing 36 and which is rigidly-secured thereto by means of fastening bolts 63. The peripheral edge of the cover 61 is formed with an annular groove in which is seated a resiliently-deformable O-ring 64 to provide a sealed connection between the top wall 61 and the main body of the housing 36, as shown in FIGURE 4. The upper end portion of shaft 14 is suitably-journaled in the top portion of housing 36, for example, by means of a cone-bearing assembly 65 having the inner raceway 66 and the outer raceway 67 with intervening conical roller bearings 68. The inner raceway 66 is secured on the somewhat reduced top end portion 69 of shaft 14 and the outer raceway 67 is mounted in an annular seat 70 formed in the wall of the casing 36, as shown in FIGURE 4. The inner raceway 66 is secured on the portion 69 by means of the clamping nut 71 and the lock nut 72 threadedly-engaged on the top end portion of shaft 14 above the section 69 of said shaft.

Designated at 74 is a ring gear having internal teeth 75 and having a bottom wall 76 which is splined onto the top end of shaft 14 and which is clamped thereto by a horizontal fastening disc 77 bolted respectively to the top end of shaft 14 and to the bottom wall 76, being received in an annular recess 78 formed in wall 76, as shown in FIGURE 4. Axially-journaled on disc 77 and in top wall 61 is a vertical shaft 79 integrally-formed with a driving pinion gear 80 which is, in turn, gearingly-coupled to ring gear 74 by a plurality of idler gears 81 journaled on depending vertical shafts 82 secured to and carried by top wall 61 and being spaced equally around the shaft 79. As shown in FIGURE 3, the idler gears 81 are meshingly-engaged with the teeth of the driving pinion gear 80 and with the inwardly-facing teeeth 75 of ring gear 74.

Shaft 79 is driven by a conventional hydraulic motor 83, the shaft of the motor 83 being suitably drivingly-coupled to the shaft 79, for example, through a conventional transmission gear assembly carried in a supporting housing 85 mounted on top wall 61, as shown in FIGURE 2.

Designated at 87 is a conventional flexible brake band which surrounds the ring gear 74 and which is supported by a plurality of radial studs 88 threadedly-engaged through the upper portion of housing 36 and locked thereto in adjusted position by lock nuts 89 provided on the adjusting studs 88. The studs 88 are rotatably-connected at their inner ends to the brake band assembly 87, as shown at 90, so as to support the brake band in substantially concentric relationship with ring gear 74. The ends of the brake band assembly 87 are provided with generally wedge-shaped abutment members 92, 92 whose outwardly-facing surfaces are respectively engaged by rollers 93 provided on the ends of bell-crank levers 94, 94 pivoted at 95, 95 to a supporting plate 96 secured to the inside wall surface of the top portion of housing 36.

The bell-crank levers 94 have rollers 97, 97 on the inner ends of their inwardly-extending bottom arms, as shown in FIGURE 5. A brake-operating cylinder 98 is vertically-secured on top wall 61 over and between the opposing bell-crank levers 94, 94, as shown in FIGURE 5, the cylinder 98 being provided with the piston 99 having the depending piston rod 100 which extends slidably and sealingly through a suitable cover plug 101, in turn, sealingly-secured in an aperture provided therefor in top plate 61. As shown in FIGURE 5, the vertical cylinder 98 is secured on the cover plug 101, said cover plug being flanged to receive the matching bottom flange 102 of vertical cylinder 98, the cylinder 98 and the cover plug 101 being both clampingly-secured to top wall 61 by fastening bolts 103 engaged through the registering flanges of the members 98 and 101 and threadedly-engaged in top wall 61.

Piston rod 100 is provided at its bottom end with the generally triangular or wedge-shaped head portion 105 which engages between the rollers 97, 97 and which cammingly-operates the bell-crank levers 94, 94 to cause the top rollers 93, 93 thereof to be moved inwardly responsive to downward movement of piston rod 100. Thus, downward movement of the head member 105 rotates the bell-crank levers 94, 94 in directions to cause rollers 93, 93 to exert inward force on the abutment elements 92, 92, thereby contracting the brake band 87 against the external periphery of ring gear 74, thus locking the shaft 14 against rotation. Piston 99 is normally urged upwardly by a coiled spring 107 surrounding piston rod 100 and located beneath piston 99, as shown in FIGURE 5, acting to bias piston 89 upwardly toward engagement with an adjustable stop member 108 threadedly-engaged in the top wall of cylinder 98 and provided with suitable lock nut means to secure it in an adjusted position. The bell-crank levers 94, 94 are biased outwardly by respective coiled springs 109, 109 connecting their top arms to outwardly-spaced points on the inside surface of housing 36, as is clearly shown in FIGURES 3 and 5, thus urging the bottom rollers 97, 97 inwardly into contact with the opposing downwardly-convergent side edges of head member 105.

Cylinder 98 is controlled in a conventional manner, being provided with a fluid inlet conduit 111 connected to its top end portion. A fluid outlet conduit 112, leading to the fluid reservoir, is connected to said top end portion through a dump valve 201 containing a valve spool 202. Valve spool 202 is annularly-grooved so as to connect outlet conduit 112 to the top end portion of cylinder 98 when the valve spool is in its normal depressed position, shown in FIGURE 4. This allows fluid to escape from cylinder 98 to return line 112. A conduit 205 connects conduit 111 to the bottom end of dump valve 201. A fluid inlet conduit 206 is connected to the top end of dump valve 201. Conduit 206 is normally vented to atmosphere through a conventional control valve 207.

Control valve 207 may be operated to simultaneously connect the hydraulic fluid supply to lines 111 and 205, forcing spool valve 202 upwardly to sealing position and allowing the hydraulic fluid to act on piston 99, forcing rod 100 downwardly toward braking position. When control valve 207 is operated to release position, fluid is shut off from conduit 111 and is applied to conduit 206, depressing spool valve 202 to its normal release position and allowing the fluid in cylinder 98 to return to the reservoir through conduit 112. As above-described, when the piston 99 is forced downwardly, the brake band 87 tightens around ring gear 74, thereby locking shaft 14 against rotation, which thus holds the scoop 11, or other implement carried by the shaft in a fixed angular position relative to the axis of shaft 14.

Figure 6:
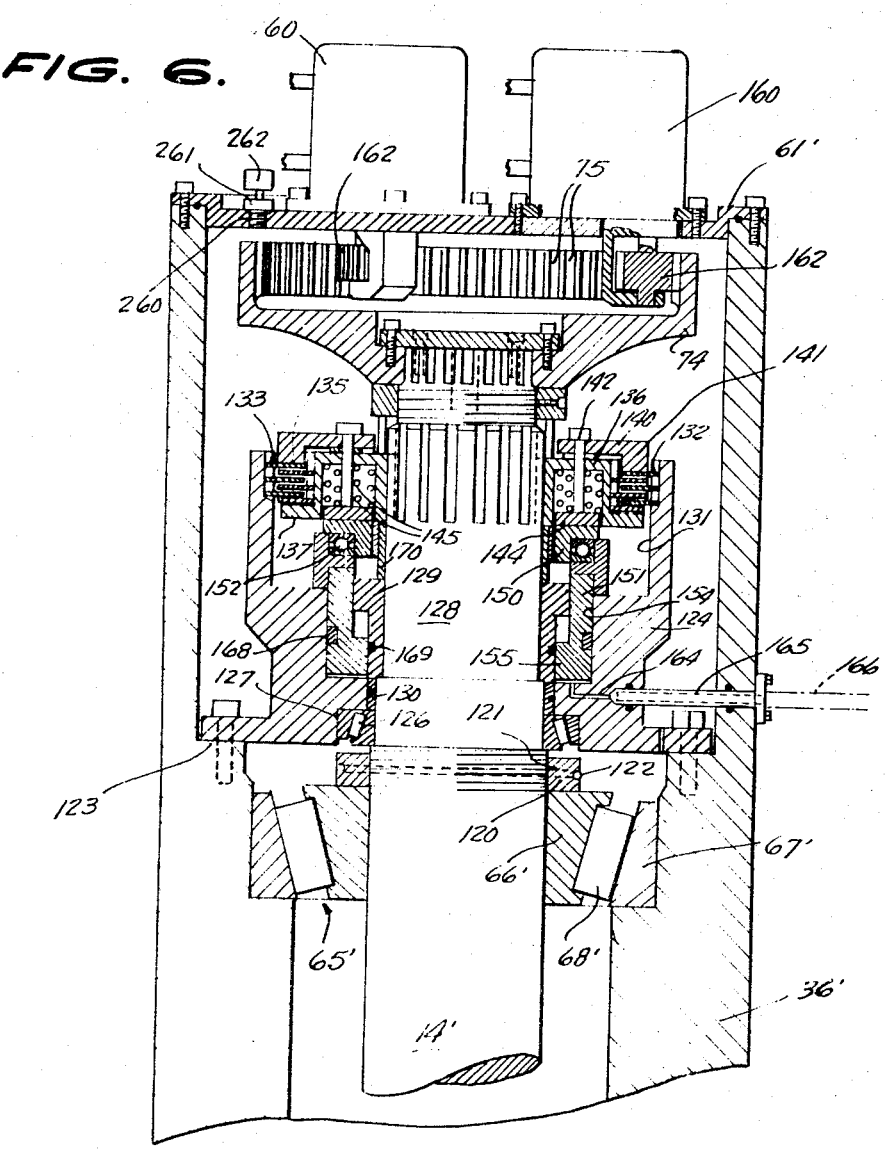
FIGURE 6 is a vertical cross-sectional view taken through the upper portion of a modified form of swivelling tool support constructed in accordance with the present invention, employing brakes of the disc-type instead of the band-type.

In the modified form of the invention illustrated in FIGURE 6, the upper portion of the shaft, shown at 14', is also rotatably-supported in the housing, shown at 36', by a roller bearing assembly 65' comprising the outer race 67' seated in a recess provided therefor in the wall of housing 36', and an inner race 66' secured to the shaft 14', and intervening bearing roller 68'. A bearing retaining nut 120 is threadedly-engaged on the shaft 14', the retaining nut being locked in position by a radial fastening pin 121 engaged through a radial bore provided in the nut 120 and engaged in a locking recess provided therefor in the threaded portion of shaft 14', the pin 121 being, in turn, retained in locking position by a snap-ring 122 seated in an external groove provided therefor in the locking nut 120.

The upper portion of housing 36' is formed with the upwardly-facing internal annular shoulder 123 on which is secured an annular disc-brake housing 124 surrounding the upper end portion of shaft 14' and located subjacent the ring gear member 74 rigidly-secured to the top end of said shaft 14'.

As shown in FIGURE 6, the portion of shaft 14' above the retaining nut 120 is journaled to the upstanding annular body 124 by the provision of a roller-bearing assembly 126 between said portion of shaft 14' and an annular counterbore or seat 127 provided therefor in member 124. Shaft 14' has a further reduced portion 128 on which is secured a flanged collar member 129. A suitable sealing gasket 130 is provided on the subjacent portion of shaft 14' beneath collar member 129, as shown in FIGURE 6.

The annular body 124 is formed with the large upper counterbore portion 131 having inwardly-facing splined teeth 132 at its top end Correspondingly notched annular brake-disc ring elements 133 are slidably and nonrotatably-engaged with the splined teeth 132. Interleaved with the nonrotatable brake ring elements 133 are further annular flat brake ring elements 135 which are splined to a downwardly-facing flanged annular cup member 136 which is, in turn, splined to the top end portion of shaft 14' below the ring gear 74. The peripheral flange 137 of the annular cup member 136 underlies the interleaved flat cooperating brake ring elements 135, 133, as shown in FIGURE 6. The top retainer ring 140 concentrically-overlies cup member 136, the member 140 having a depending peripheral flange 141 overlying the top brake-disc element 133. Circularly-arranged headed spaced bolts 142 extend slidably through retainer disc 140, and top wall of cup 136 and are secured at their bottom ends to a brake-spring retainer ring 144. Coiled springs 145 surround the bolts 142, biasing cup member 136 upwardly relative to ring 144. The springs 145 thus act to bias the brake-disc elements 133, 135 into cooperating interengaging braking relationship.

Surrounding shaft portion 128 and underlying ring 144 is a brake-release collar member 150 of right-angled cross-section which is rotatably-supported in the top rim of an annular hydraulic cylinder assembly 151, for example, by a ball-bearing assembly 152. The annular hydraulic chamber 151 is sealingly and slidably-supported in an intermediate counterbore 154 formed in the member 124 below the main counterbore 131. The member 151 thus serves as a piston element in the fluid-pressure cylinder defined by the counterbore 154. Member 151 has the inwardly-directed botom flange 155 which is engageable with the top flange of the collar member 129 to limit the upward movement of the piston member 151. When the member 151 is elevated, it acts upwardly on the spring-retaining ring 144 to compress the coiled springs 145 and elevated the bolts 142, thus relieving the biasing force normally tending to produce braking interengagement of the friction ring elements 133, 135. This unlocks shaft 14' from the housing 36', permitting the shaft to be angularly-rotated to provide a desired angular position of the scoop or tool attached to the shaft. To accomplish such rotation, respective hydraulic motors 160 may be provided on the top wall 61' of the housing 36', the hydraulic motors being connected to respective driving pinions 162 gearingly-engaged with the teeth 75 of ring gear 74.

Hydraulic fluid under pressure may be applied beneath piston element 155 by the provision of a supply passage 164 formed in the lower portion of member 124 which communicatively-connects to a conduit 165 mounted in the wall of housing 36' and entering the lower end portion of member 124, as shown in FIGURE 6. A suitable hydraulic fluid-supply conduit 166 may be connected to the conduit 165 in any suitable manner. As above-explained, shaft 14' is normally locked in fixed position by the interengagement of the friction rings 133, 135 under the biasing force of the springs 145. When hydraulic fluid under pressure is admitted through passage 164 into the bottom of the working cylinder space 154, the piston element 155 is elevated, disengaging the friction disc elements 133, 135, thereby releasing shaft 14'.

A suitable sealing gasket ring 168 is provided in an annular groove formed in member 151, sealing said member in the working cylinder bore 154. A similar sealing ring 169 is provided in an annular groove formed in the lower portion of member 129, sealing the inwardly-directed bottom flange 155 with respect to said member 129.

A retaining sleeve 170 is provided on shaft portion 128 between member 129 and the annular cup member 136, locking collar 129 against movement on shaft portion 128.

In either of the embodiments illustrated in FIGURES 1 to 5, or in FIGURE 6, means is provided for transmitting hydraulic fluid to the tool-operating cylinder 20 while allowing universal rotation of said cylinder with the shaft 14 or 14'. Referring to FIGURE 7, the flexible conduit 171 is connected to the upper conduit fitting 22 of cylinder 20 and another flexible conduit 172 is connected to the lower conduit fitting 24 of said cylinder 20. An annular housing 173 surrounds the saft 14 (or 14') beneath the housing 36 (or 36') and is secured to the bottom of said housing by a plurality of Z-shaped fastening brackets 174, as shown in FIGURE 7. The housing 173 is generally toroidal and has a downwardly-facing U-shaped cross-section, as is clearly shown in FIGURE 7. Rotatably-mounted in the housing 173 is an annular ring-shaped body 175 which is provided with a plurality of peripheral grooves containing sealing rings 176 sealingly and rotatably-engaged with the inside surface of the annular housing 173. Roller-bearing assemblies 177 are provided between the upper inner and outer corner portions of ring member 174 and the adjacent portions of housing 173, and similar roller-bearing assemblies 178 are provided between the inner and outer lower corner portions of ring member 175 and the adjacent portions of housing 173, as shown in FIGURE 7. The ring member 175 is thus freely rotatable relative to the housing 173 and is sealingly engaged therewith. Housing 173 is provided with an annular bottom cover plate 179 which is suitably rotatably-sealed relative to a depending annular bottom rib 180 provided on the ring member 175. The rib 180 is rigidly-secured to shaft 14 (or 14') by means of connecting brackets 182 secured to a fastening ring 183 which is, in turn, bolted to the shaft 14 (or 14').

A first hydraulic fluid-supply or return conduit 184 is connected to the generally cylindrical outer wall of housing 173 in communication with an inwardly-facing annular groove 185 formed in said wall. Groove 185 is in communication with a passage 186 formed in the ring-shaped body 175 and extending downwardly. The flexible conduit 171 is connected to the bottom end of passage 186. Similarly, a second hydraulic fluid-supply or return conduit 187 is connected to the wall 173 in communication with a second inwardly-facing annular groove formed in said wall, communicating with another passage 188 which extends downwardly and to which the bottom end of conduit 172 is connected. Thus, the cylinder 20 may be controlled by hydraulic fluid furnished thereto through one of the conduits 184 or 187 and exhausting back through the other of the conduits 184 or 187.

The swivelling connection provided between ring member 175 and housing 173 allows free rotational adjustments of shaft 14 (or 14') without interference with the conduits connected to the tool-operating cylinder 20.

FIGURES 8, 9 and 10 illustrate other arrangements for providing sealed swivelling connections for the hydraulic control system leading to the conduits 171 and 172 associated with the tool-operating cylinder 20. Thus, in the arrangement shown in FIGURES 8 and 9, the tool-supporting shaft 14 (or 14') is provided with an axial bore 190 having a reduced bottom end portion 191 communicating with a passage 192 to which the conduit 172 is connected. Another passage 193 in the shaft connects the relatively large main portion of bore 190 to the other working cylinder hydraulic fluid conduit 171. An axial rigid tubular conduit 194 is mounted in the bore 190 with its bottom end sealingly-received in the reduced bottom end bore portion 191, as shown in FIGURE 8, whereby the conduit 194 communicates with the working cylinder flexible conduit 172 and the annular space 196 in bore 190 exterior to conduit 194 communicates with the second flexible working cylinder conduit 171. A vertical nipple 197 connects the top end of bore 190 to a connection fitting 198 sealingly-secured on the top wall 61 (or 61') of the main housing 36 (or 36'). A dome-shaped top cap 199 is sealingly-secured on the fitting 198, defining a fluid space 200. The top end of conduit 194 extends through a sealing bushing 201 into the space 200. The space in fitting 198 below bushing 201 communicates with a passage 202 provided in the fitting to which is connected one hydraulic fluid-supply or return conduit 184. The other hydraulic fluid-supply or return conduit 187 is connected to the dome-shaped member 199 and is thus in communication with space 200.

An apertured spacer bushing 205 is secured to the upper portion of conduit 194 in the nipple 197 to support conduit 194 axially in said nipple while allowing free flow of fluid therepast and without interfering with communication between passage 202 and space 196. The nipple 197 is free to swivel relative to the connection fitting 198, and the rigid tubular conduit 194 is likewise free to swivel relative to the fitting 198, the bushing 201 being sealingly and rotatably-engaged in the central bore provided therefor in fitting 198. Bushing 201 may be rigidly-secured to conduit 194 in any suitable manner. Said bushing is sealingly and rotatably-engaged in the central bore fitting 198, as above-mentioned. The sleeve or nipple 197 is sealingly and rotatably-engaged in a depending sleeve-like bottom end portion 206 provided on the fitting member 198. Nipple 197 may be threadedly-engaged in the top end of the shaft and locked thereto by a lock nut 210.

In the modification illustrated in FIGURE 10, a liner or sleeve 220 is secured in the bore 190, the sleeve 220 being apertured at its bottom end, as shown at 221, to establish communication with the passage 193. The top end of the sleeve 220 communicates with the top end portion of bore 190 and passage 202, as in FIGURE 8.

The modification illustrated in FIGURE 6 is designed so that the housing 36' can operate with its interior substantially filled with oil, whereby to provide adequate lubrication of the various moving parts contained therein. The friction linings on the braking elements are preferably of the segmented metallic-fiber type, for example, of the type marketed under the tradename "Velva-Touch," and are especially designed to operate in oil with a long-wearing life. This material is also preferably employed for the friction surface of the brake-band member 87 in the embodiment shown in FIGURE 3.

In the assembly shown in FIGURE 6, the top end of housing 36' is preferably provided with a breather hole, shown at 260, containing a threaded sleeve element or bushing member 261 in which is slidably-mounted a headed magnetic plug 262. By removing the plug 262, the sleeve 261 may be employed as a filling conduit to replenish the oil in housing 36'.

While certain specific embodiments of an improved swivelling tool support for an earth-working machine have been disclosed in the foregoing description, it will be understood that various modifications within the spirit of the invention may occur to those skilled in the art.

What is claimed is:

1. A swivelling tool support for attachment to the boom of an earth-working machine, said support comprising a housing, means for pivotally-attaching said housing for swinging movement in the plane of a boom, a tool-support shaft having an upper end disposed in said housing and a lower portion protruding therefrom, bearing means supporting said shaft for unlimited free rotation about its own axis relative to said housing, braking means to at times retain said shaft locked against rotation, means on the lower portion of the shaft pivotally-supporting an earth-working tool, and cooperating swivel fluid-connection means mounted on said housing and said shaft for conveying working fluid to an earth-working tool mounted on the shaft, wherein said swivel fluid-connection means comprises an axial bore formed in said shaft and a tubular conduit mounted coaxially in said bore, defining a concentric dual fluid-transmission system for transmitting pressure fluid to said tool and providing a fluid-retracting path therefrom, the top end of the shaft having an upstanding conduit portion forming an extension of said bore and the housing having a first fluid chamber rotatably and sealingly-receiving said conduit portion and a second fluid chamber above said first fluid chamber rotatably and sealingly-receiving the top end of the tubular conduit, and fluid supply and return conduits respectively connected to said chambers.

2. The swivelling tool support of claim 1, and wherein said braking means comprises an annular friction surface carried by said shaft, a braking element on said housing movable into frictional engagement with said friction surface, fluid pressure cylinder means mounted on the housing, and working piston means in said fluid pressure-cylinder means operatively-engaged with said braking element.

3. The swivelling tool support of claim 2, and wherein said annular friction surface comprises a drum secured to the upper end of the tool-support shaft, and wherein said braking element comprises a brake band surrounding said drum.

4. The swivelling tool support of claim 2, and wherein said annular friction surface comprises a first axially-movable friction ring element splined to said shaft and wherein said shaft is provided with means limiting axial movement of said first ring element, and wherein said braking element comprises a second axially-movable friction ring element splined to said housing.

5. The swivelling tool support of claim 4, and wherein the shaft is provided with an annular housing member received in said friction ring elements and splined to said first friction ring element, and wherein said means limiting axial movement of said first ring element comprises a flange on said annular housing member.

References Cited

UNITED STATES PATENTS

| | | | |
|---|---|---|---|
| 2,927,706 | 3/1960 | Mork | 214—138 |
| 3,253,724 | 5/1966 | Marner | 214—138 |
| 3,319,813 | 5/1967 | Beyea | 214—133 |

HUGO O. SCHULZ, *Primary Examiner.*